(12) United States Patent
Bratton (10) Patent No.: US 11,097,214 B2
(45) Date of Patent: Aug. 24, 2021

(54) IN-LINE SWIRL VORTEX SEPARATOR

(71) Applicant: Rodney Allan Bratton, Calgary (CA)

(72) Inventor: Rodney Allan Bratton, Calgary (CA)

( * ) Notice: Subject to any disclaimer, the term of this patent is extended or adjusted under 35 U.S.C. 154(b) by 144 days.

(21) Appl. No.: 16/324,455

(22) PCT Filed: Aug. 8, 2017

(86) PCT No.: PCT/CA2017/050939
§ 371 (c)(1),
(2) Date: Feb. 8, 2019

(87) PCT Pub. No.: WO2018/027314
PCT Pub. Date: Feb. 15, 2018

(65) Prior Publication Data
US 2019/0168147 A1 Jun. 6, 2019

Related U.S. Application Data

(60) Provisional application No. 62/372,640, filed on Aug. 9, 2016.

(51) Int. Cl.
| | |
|---|---|
| *B01D 45/12* | (2006.01) |
| *B01D 45/16* | (2006.01) |
| *B04C 3/06* | (2006.01) |
| *B04C 5/103* | (2006.01) |
| *B04C 3/00* | (2006.01) |

(52) U.S. Cl.
CPC ............ *B01D 45/12* (2013.01); *B01D 45/16* (2013.01); *B04C 3/00* (2013.01); *B04C 3/06* (2013.01); *B04C 5/103* (2013.01); *B04C 2003/006* (2013.01)

(58) Field of Classification Search
CPC .......... B01D 45/12; B01D 45/16; B04C 3/06; B04C 3/00; B04C 2003/006; B04C 5/103
See application file for complete search history.

(56) References Cited

U.S. PATENT DOCUMENTS

| | | | | |
|---|---|---|---|---|
| 505,977 | A | * 10/1893 | Fletcher | ................ B01D 45/08 55/392 |
| 1,982,733 | A | * 12/1934 | Forster | ..................... B04C 5/12 55/405 |
| 2,010,456 | A | * 8/1935 | Jones | ..................... B01D 50/00 55/333 |
| 3,578,264 | A | 5/1971 | Kuethe | |
| 3,741,285 | A | 6/1973 | Kuethe | |

(Continued)

FOREIGN PATENT DOCUMENTS

| | | |
|---|---|---|
| CA | 2068148 A1 | 12/1992 |
| EP | 3184176 A1 | 6/2017 |

(Continued)

OTHER PUBLICATIONS

ISA Canadian Intellectual Property Office, International Search Report Issued in Application No. PCT/CA2017/050939, dated Oct. 19, 2017, WIPO, 2 pages.

*Primary Examiner* — Dung H Bui
(74) *Attorney, Agent, or Firm* — McCoy Russell LLP (57) ABSTRACT

An in-line swirl vortex separator to separate solids, liquids, particulate from a vapor stream. The swirl vortex separator includes a swirl element and a vortex element. The vortex element creates pairs of vortices that are substantially equal and opposite in direction.

19 Claims, 6 Drawing Sheets

(56) References Cited

U.S. PATENT DOCUMENTS

| | | | |
|---|---|---|---|
| 3,751,886 A * | 8/1973 | Sokolowski | B01D 45/16 55/318 |
| 3,893,914 A * | 7/1975 | Bobo | B04C 3/06 209/718 |
| 3,895,930 A * | 7/1975 | Campolong | B04C 3/00 55/394 |
| 4,001,121 A | 1/1977 | Bielefeldt | |
| 4,081,249 A * | 3/1978 | Baillie | B01J 8/0055 208/164 |
| 4,108,778 A | 8/1978 | Lambert et al. | |
| 4,156,485 A | 5/1979 | Skardal | |
| 4,238,210 A * | 12/1980 | Regehr | B01D 45/12 55/396 |
| 4,263,027 A | 4/1981 | Varnas et al. | |
| 4,296,864 A | 10/1981 | Misaka et al. | |
| 4,349,360 A * | 9/1982 | Schuurmans | B01D 47/06 96/311 |
| 4,537,314 A | 8/1985 | Skardal | |
| 5,498,273 A | 3/1996 | Mann | |
| 5,934,484 A | 8/1999 | Grimes | |
| 5,958,094 A | 9/1999 | Schwamborn et al. | |
| 6,257,415 B1 | 7/2001 | Wark | |
| 6,376,732 B1 | 4/2002 | Ngan et al. | |
| 6,752,860 B1 | 6/2004 | Hoydal et al. | |
| 6,837,912 B1 * | 1/2005 | Heumann | B04C 5/103 55/424 |
| 6,962,199 B1 | 11/2005 | Tjeenk Willink | |
| 7,318,849 B2 | 1/2008 | Betting et al. | |
| 7,434,696 B2 | 10/2008 | Soto | |
| 7,494,535 B2 | 2/2009 | Betting et al. | |
| 7,875,103 B2 | 1/2011 | Mueller | |
| 7,931,719 B2 * | 4/2011 | Sams | B01D 45/12 55/348 |
| 8,052,778 B2 | 11/2011 | McFarland et al. | |
| 8,226,743 B2 * | 7/2012 | Betting | B04C 3/00 95/32 |
| 8,403,149 B2 | 3/2013 | Kadota et al. | |
| 8,434,723 B2 | 5/2013 | Simpson et al. | |
| 8,757,701 B2 | 6/2014 | Guigné et al. | |
| 8,940,067 B2 | 1/2015 | Mueller | |
| 8,991,622 B2 * | 3/2015 | Schook | B04C 3/00 210/512.3 |
| 9,027,551 B2 | 5/2015 | King et al. | |
| 9,283,502 B2 | 5/2016 | Balepin et al. | |
| 9,636,614 B2 * | 5/2017 | Akdim | B04C 3/06 |
| 2003/0115843 A1 | 6/2003 | Haland | |
| 2007/0266683 A1 * | 11/2007 | McDowell | A47L 5/362 55/429 |
| 2008/0290023 A1 * | 11/2008 | Greene | B01D 21/2444 210/512.1 |
| 2009/0065431 A1 | 3/2009 | Bakke et al. | |
| 2009/0282858 A1 * | 11/2009 | Demetri | F25B 9/004 62/401 |
| 2009/0300872 A1 * | 12/2009 | Griffith | A47L 9/1608 15/347 |
| 2010/0237008 A1 * | 9/2010 | Goninan | C02F 1/005 210/512.1 |
| 2012/0012006 A1 | 1/2012 | Fadda | |
| 2013/0081368 A1 * | 4/2013 | Mueller | B01D 45/16 55/391 |
| 2013/0239811 A1 * | 9/2013 | Moen | B01D 19/0026 95/261 |
| 2014/0251140 A1 * | 9/2014 | Sams | B04C 5/04 95/261 |
| 2015/0290560 A1 * | 10/2015 | Hoydal | B01D 19/0042 95/22 |
| 2015/0306528 A1 * | 10/2015 | Mueller | B04C 3/06 55/338 |

FOREIGN PATENT DOCUMENTS

| | | |
|---|---|---|
| GB | 1259901 A | 1/1972 |
| WO | 2014207115 A1 | 12/2014 |

* cited by examiner

IN-LINE SWIRL VORTEX SEPARATOR

CROSS-REFERENCE TO RELATED APPLICATIONS

The present application is a U.S. National Phase of International Patent Application Serial No. PCT/CA2017/050939, entitled "IN-LINE SWIRL VORTEX SEPARATOR," filed on Aug. 8, 2017. International Patent Application Serial No. PCT/CA2017/050939 claims priority to U.S. Provisional Patent Application No. 62/372,640, filed on Aug. 9, 2016. The entire contents of each of the above-cited applications are hereby incorporated by reference for all purposes.

FIELD OF THE INVENTION

The present disclosure relates generally to systems and methods for removing non-gaseous materials from a vapor stream. More particularly, the present disclosure relates to removing small and small/medium solid particles and fine liquid drops from a flowing vapor stream.

BACKGROUND OF THE INVENTION

Flowing vapor (i.e. gas) streams may contain undesirable particles or droplets of material, for example liquid droplets and solid particles. In many applications, it is desirable to separate these undesirable droplets/particles from the gas stream. Generally, as discussed below, as particles become smaller, it is increasingly difficult to separate them from a gas stream.

In particular, gas streams containing medium size solid particles (<100 microns) and particularly small size solid particles, (<1 microns) are difficult to separate from a gas stream due to their low mass, low settling velocities and susceptibility to turbulence.

For the purposes of discussion herein gas borne particles are solids or liquids suspended in a gas such as air. Larger particles are generally defined as those larger than 100 μm. These particles have sedimentation velocities in air greater than 0.5 m/s and will fall out quickly under gravity. Typical larger particles include insect debris, room dust, soot aggregates, coarse sand, and non-aerosol sprays.

Medium size particles are generally those in the range 1 to 100 μm. These particles have sedimentation velocities in air generally greater than 0.2 m/s. Examples of medium size particles include fine ice crystals, pollen, hair, larger bacteria, windblown dust, fly ash, coal dust, silt, fine sand, and small dust.

Small particles are generally those less than 1 μm. These particles fall slowly and may take days to years to settle out of a quiet atmosphere. In a turbulent atmosphere they may never settle out but can be washed out by water or rain. Typical small particles include biological particles such as viruses and small bacteria, various fumes including metallurgical, oil and tobacco smoke and other small solid particles such as soot and fine powders such as talc.

Table 1 shows some typical sizes of different particles.

TABLE 1

Particle Size of Different Particles
(Source: www.engineeringtoolbox.com)

| Particle | Particle Size (microns) |
| --- | --- |
| Anthrax | 1-5 |
| Antiperspirant | 6-10 |

TABLE 1-continued

Particle Size of Different Particles
(Source: www.engineeringtoolbox.com)

| Particle | Particle Size (microns) |
| --- | --- |
| Asbestos | 0.7-90 |
| Atmospheric Dust | 0.001-40 |
| Auto and Car Emission | 1-150 |
| Bacteria | 0.3-60 |
| Bromine | 0.1-0.7 |
| Burning Wood | 0.2-3 |
| Carbon Black Dust | 0.2-10 |
| Clay | 0.1-50 |
| Coal Dust | 1-100 |
| Coal Flue Gas | 0.08-0.2 |
| Corn Starch | 0.1-0.8 |
| Dot (.) | 615 |
| Face Powder | 0.1-30 |
| Fly Ash | 1-1000 |
| Household dust | 0.05-100 |
| Liquid Droplets | 0.5-5 |
| Mold | 3-12 |
| Mold Spores | 10-30 |
| Oil Smoke | 0.03-1 |
| Pet Dander | 0.5-100 |
| Pollen | 10-1000 |
| Skin flakes | 0.5-10 |
| Talcum Dust | 0.5-50 |
| Tobacco Smoke | 0.01-4 |
| Typical Atmospheric Dust | 0.001 to 30 |
| Viruses | 0.005-0.3 |
| Yeast Cells | 1-50 |

As noted, the difficulty in separating smaller particles is a result of their small mass and low settling velocities. This problem is compounded by any turbulence of the gas media they, may be within.

In the past, various systems have been developed to effect separate of medium and small particles from a flowing gas stream. Examples of various past systems are briefly discussed below:

U.S. Pat. No. 8,434,723 describes low drag asymmetric tetrahedral vortex generators used for separating large particles from a gas; U.S. Pat. No. 8,403,149 describes a cyclone classifier, flash drying system using the cyclone classifier, and toner prepared by the flash drying system; U.S. Pat. No. 7,494,535 describes a cyclonic fluid separator having a plurality of tilted wings; U.S. Pat. No. 6,962,199 describes a method for removing condensables from a natural gas stream at a wellhead and downstream of the wellhead choke; U.S. Pat. No. 6,257,415 describes a multi-outlet diffuser system having a number of static diffuser elements; U.S. Pat. No. 5,958,094 describes a cyclone collector and cyclone classifier: U.S. Pat. No. 5,934,484 describes a channeling dam for centrifugal cleaner: U.S. Pat. No. 4,537,314 describes a vortex cleaner for separating fibre-liquid suspensions having a plurality of baffles; U.S. Pat. No. 4,296,864 describes an air classifier having a plurality of vortex generators; U.S. Pat. No. 4,263,027 describes a multi-vortical separator that creates numerous counter-rotating vortices within the interior of a chamber; U.S. Pat. No. 4,156,485 describes a vortex cleaner for cleaning larger particles such as wood chips and paper pulp suspensions; U.S. Pat. No. 4,108,778 describes a self-cleaning filter and vortexer having a vortex inducing tab; US Patent Application No. 2009/0065431 describes an in-line separator having a swirl section; WO 2014/207115 describes a dehumidification device for a multistage supercharging device; U.S. Pat. No. 8,940,067 describes swirl helical elements for a viscous impingement particle collection and hydraulic removal system; U.S. Pat. No. 8,757,701 describes drag reduction device for transport vehicles having randomized irregular shaped edge vortex generating channels; U.S. Pat. No. 7,875,103 describes a sub-micron viscous impingement particle collection and hydraulic removal system; U.S. Pat. No. 7,434,696 describes an inlet head for a cyclone separator; U.S. Pat. No. 7,318,849 describes a cyclonic fluid separator equipped with adjustable vortex finder position; U.S. Pat. No. 4,001,121 describes systems and methods for the centrifugal treatment of fluids; U.S. Pat. No. 3,741,285 describes systems and methods for boundary layer control of flow separation and heat exchange; U.S. Pat. No. 3,578,264 describes systems and methods for boundary layer control of flow separation and heat exchange and US Patent Application No. 2012/0012006 describes a pocketed cyclonic separator.

Still further separation systems are described in Canadian patent application 2,068,148, EP Publication 3184176, U.S. Pat. Nos. 5,498,273, 8,052,778, 9,027,551 and 9,283,502.

While various features of gas/liquid/solid separators are described, there remains a need for systems that are particularly effective in separating smaller and smaller medium sized particles (ie. <10 microns) from a gas stream.

SUMMARY OF THE INVENTION

It is an object of the present disclosure to obviate or mitigate at least one disadvantage of previous separators.

In a first aspect, the present disclosure provides an in-line swirl vortex separator comprising a flow conduit, the flow conduit including a swirl element and a vortex element, the vortex element proximate and downstream from the swirl element, wherein the vortex element is adapted to create pairs of vortices that are substantially equal and opposite in direction.

In one embodiment, the vortex element comprises at least one pair of vortex tabs positioned against an inner surface of the flow conduit.

In various embodiments, each pair of vortex tabs are angled relative to a vortex tab axis between each pair of vortex tabs. The angle between each vortex tab and the vortex tab axis may be between 12-28° and each pair of vortex tabs may diverge or converge in the direction of flow. Each vortex tab will have a leading edge and a trailing edge; each leading edge and trailing edge can be any one of straight, swept forward, swept backwards, convex or concave relative to a direction of flow.

In one embodiment, the flow conduit has an inside diameter (ID) and each vortex tab has a height and where a preferred ratio of ID to height is between 5:1 and 50:1.

In one embodiment, each vortex tab has a length and a height and a ratio of length to height is preferably between 2:1 and 6:1.

In one embodiment, the flow conduit further comprises an outer flow conduit radial to the flow conduit, the outer flow conduit configured to create an annular space between the flow conduit and outer flow conduit and wherein the flow conduit includes a circumferential drain adjacent a downstream end of the flow conduit enabling solid/liquid flowing along the flow conduit to drain to the annular space.

In one embodiment, the annular space enables gas within the annular space to be recycled to an upstream location within the flow conduit.

In other embodiments, the swirl element includes a plurality of stator vanes angled between 40-70° relative to a longitudinal axis of the flow conduit, the stator vanes for inducing swirling flow of gas/liquid/solids flowing through the flow conduit.

In yet further embodiments, each pair of vortex tabs has a vortex tab axis between each pair of vortex tabs and the vortex tab axis is substantially aligned with the angle of the stator vanes.

In still further embodiments, each pair of vortex tabs are adjustable in at least one of height relative to an inner surface of the flow conduit and the angle of the vortex tab axis relative to the longitudinal axis of the flow conduit.

In one embodiment, the annular space includes a sump for draining fluids/solids from within the annular space.

In another embodiment, the flow conduit includes a liquid injector, the liquid injector adapted to deliver a liquid: proximate and upstream of the swirl element; between the swirl element and the vortex element; or proximate the vortex element.

In one embodiment, the separator includes a liquid/solid reservoir for receiving liquid/solid from the flow conduit and a pump for returning recovered/liquid solid to the flow conduit at an upstream position of the flow conduit.

In another aspect, the invention provides a method of separating a contaminant from a vapor stream within a flow conduit comprising the steps of: swirling the vapor stream to form a swirling vapor stream; generating pairs of vortices in the swirling vapor stream, the vortices substantially equal and opposite in direction; and removing the contaminant from the vapor stream.

In one embodiment of the method, the swirling and the vortices generate centrifugal force in the same direction.

In another embodiment, the method includes the further step of injecting liquid: proximate and upstream of the swirling; between the swirling and the vortices; and/or proximate the vortices.

In another embodiment, the method includes the further step of recovering liquid from a downstream location of the flow conduit and recycling at least a portion of the recovered liquid to an upstream location of the flow conduit.

In one embodiment, the angle, position, height and length of the vortex tabs are matched to a gas flow rate within the flow conduit to effect separation of solid particles smaller than 1 micron from the flowing gas.

BRIEF DESCRIPTION OF THE DRAWINGS

The invention is described with reference to the drawings wherein.

DETAILED DESCRIPTION OF THE INVENTION

Generally, the present disclosure describes systems and methods for separation of solid particulates and/or fine liquid droplets from a vapor stream. The system is particularly effective in separating smaller medium sized particles (about 1-10 microns) and smaller particles (<1 micron) and fine liquid droplets from a flowing gas stream.

OVERVIEW

Figure 1A:
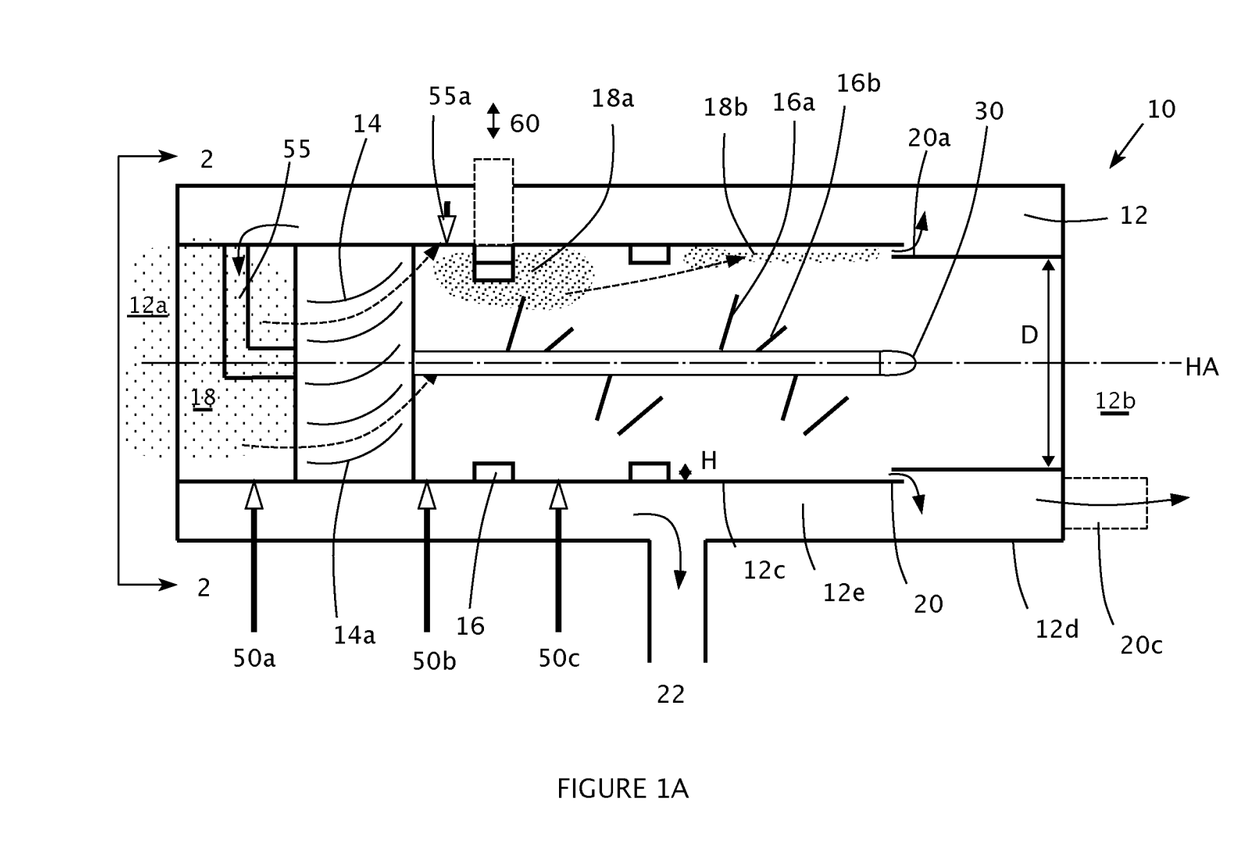
FIG. 1A is a schematic side view of an in-line swirl vortex separator in accordance with one embodiment of the invention with the housing in a horizontal orientation.
Figure 1B:
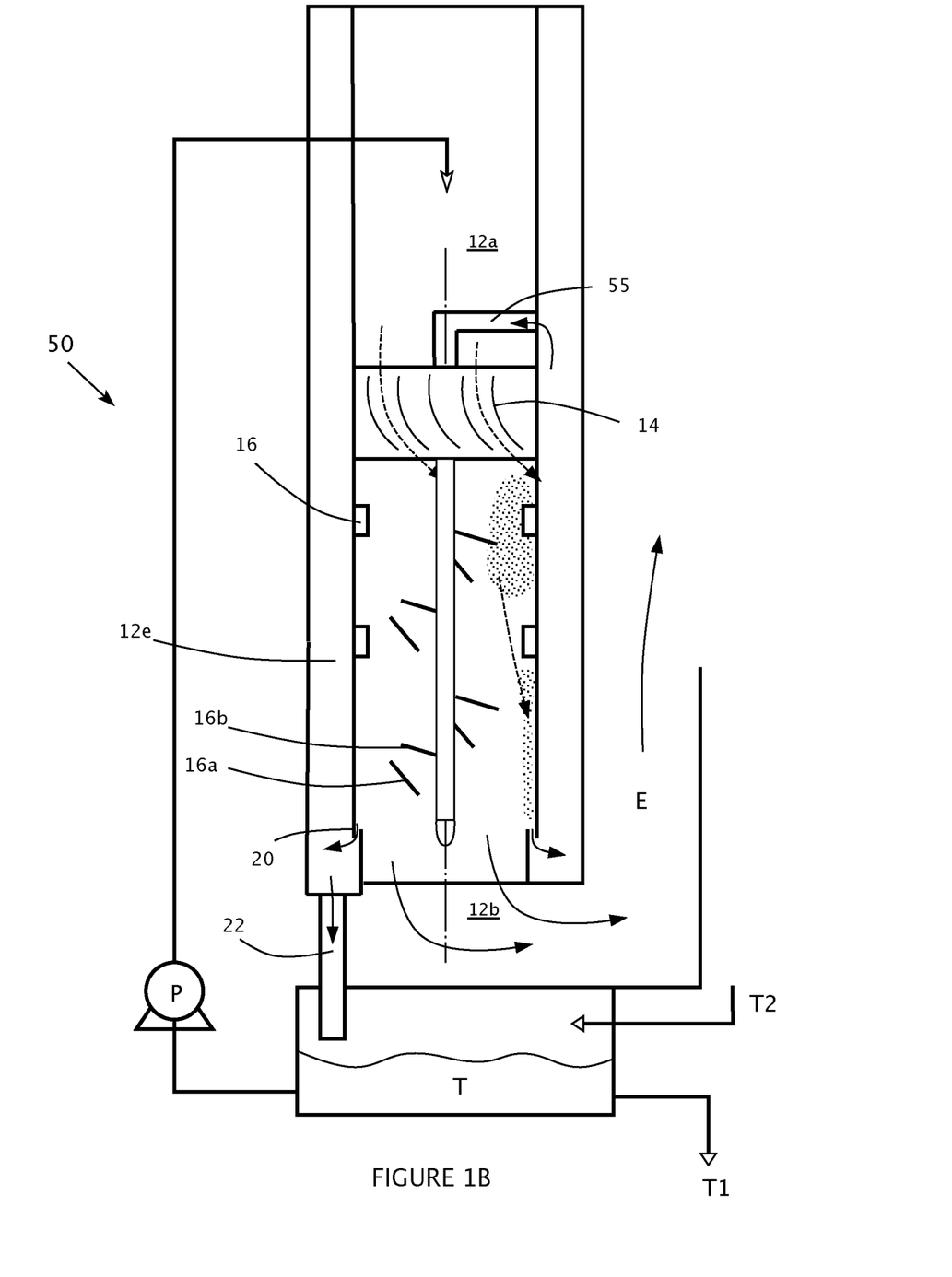
FIG. 1B is a schematic side view of an in-line swirl vortex separator in accordance with one embodiment of the invention with the housing in a vertical orientation.
Figure 2:
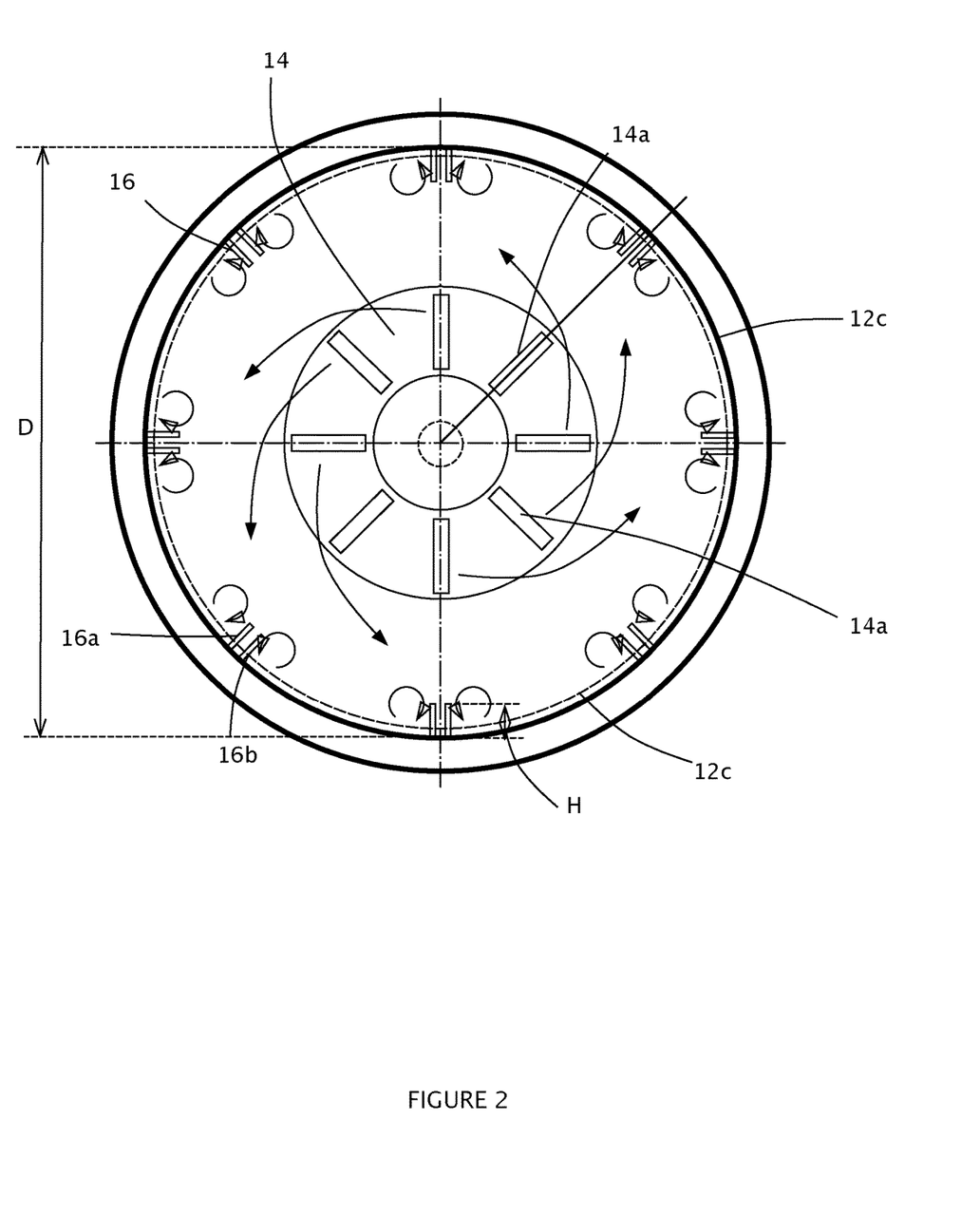
FIG. 2 is a schematic plan view of an in-line swirl vortex separator in accordance with one embodiment of the invention.

With reference to the figures, an in-line swirl vortex separator is described. As shown in FIGS. 1A, 1B and 2, the system 10 generally includes a cylindrical housing 12, a swirl element 14 and vortex elements 16. A vapor stream 18 containing solid particles and liquid droplets enters an upstream end 12a of the housing where the mixture enters the swirl element. The swirl element 14 imparts a rotational swirling motion upon the vapor stream which imparts a centrifugal force to the solid/liquid particles such that they will move radially 18a towards an interior surface 12c of the housing where the gas/solid/liquid mixture flows through and around the vortex elements 16. The vortex elements generally comprise pairs of vortex tabs 16a, 16b, positioned and oriented on the housing such that each pair of vortex tabs induces a pair of counter rotating vortices downstream of the vortex tabs. The combined effect of the swirl element, vortex tabs and counter-rotating vortices causes fine solid particles and liquid droplets to flow towards and along the housing 18b where they can be removed from the system through a drain 20.

In a preferred embodiment, and as described below, the separation and recovery of fine solid particles can be improved by introducing a film of liquid over the interior housing wall. Liquid may be introduced upstream of the swirl element 50a, upstream of the vortex elements 50b or at another location 50c and can be effective in enhancing entrainment of the solid particles within the liquid.

Further details and embodiments of the invention as well as the operation of the invention are described.

Housing

Generally, the housing 12 is a cylindrical tube that can be oriented horizontally (FIG. 1A) or vertically (FIG. 1B). In most deployments the housing will be oriented horizontally or vertically with appropriate drains/pressure relief paths 20, 22 towards a downstream end 12b of the housing.

The housing may comprise an inner housing wall 12c where the primary separation as described takes place as well as an outer housing 12d wall that defines an annular space 12e. The annular space can both enable fluids/solids to drain towards a sump 22 for removal from the system as well as a flow path to recycle gas towards the upstream end of the housing as will be described in greater detail below. Gas/liquids/solids entering the annular space may also exit the system through optional port 20c.

In one embodiment, the diameter D of the inner housing is generally about 2-8 inches and preferably about 4-6 inches.

In one embodiment, the tube may be tapered narrowing towards the downstream end (not shown).

Housing Drain and Sump

A housing drain 20 is positioned downstream of the vortex tabs 16. The housing drain is typically a raised lip 20a extending around the circumference of the housing and having dimensions allowing solid/liquids to flow under the lip and enter the annular space. The sump 22 will preferably be located at a lower region of the housing such that any liquids and entrained solids can flow by gravity from the system.

FIG. 1B shows a vertical embodiment that also includes a liquid recycle system 50 having a tank T and pump P. In this embodiment, liquid containing captured solids drains into tank T and is re-circulated to a position upstream of the swirl element for re-introduction into the housing. As such over time, the liquid within tank T will become progressively dirtier with the captured solids whereby it can be drained through drain T1 and refilled by source T2.

Gas may exit the system through exit E.

FIG. 1B shows an annular space 12e although in this configuration is not required as liquid may simply drain into tank T.

Swirl Element

Figure 3:
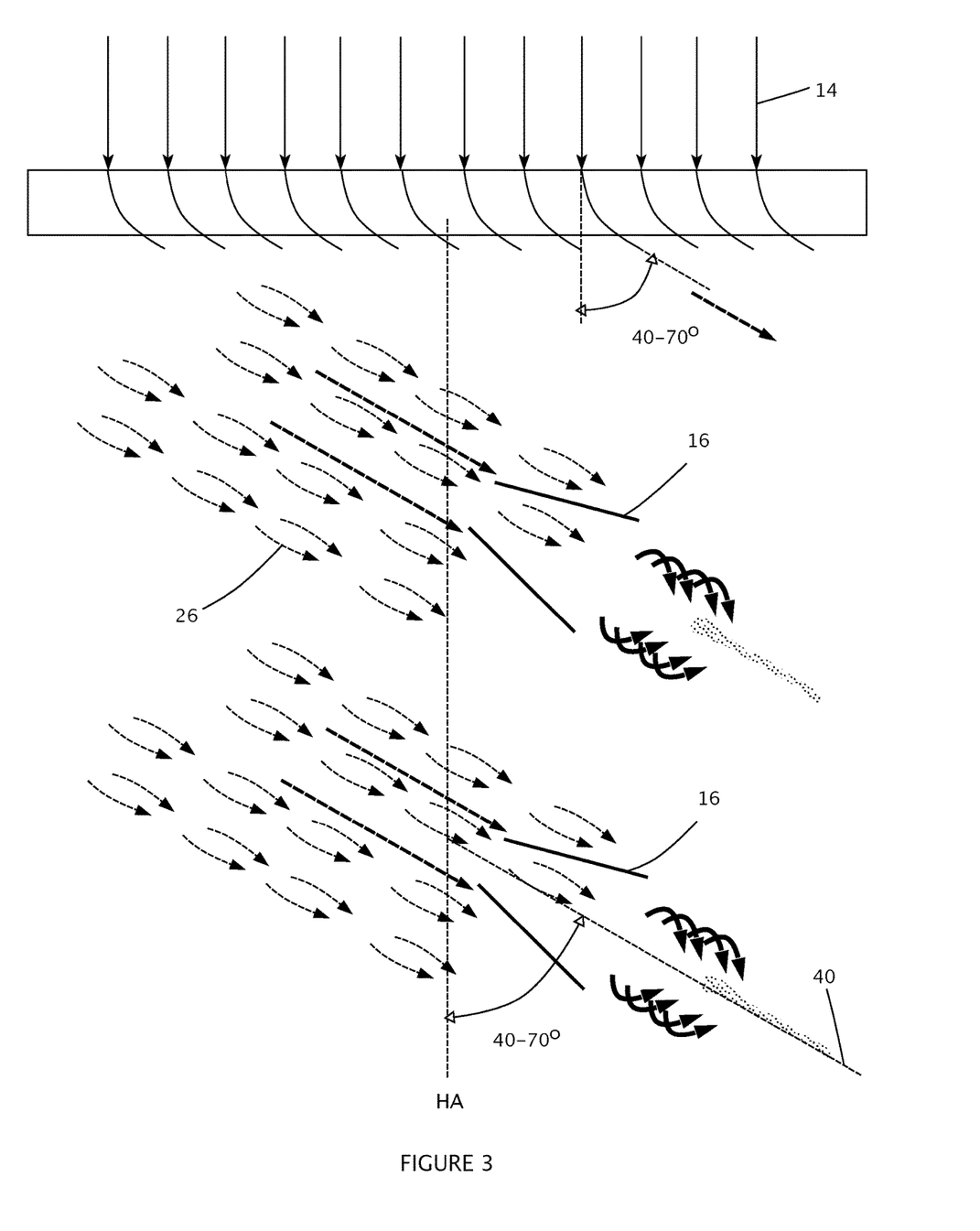
FIG. 3 is a schematic side view of the interior wall of an in-line swirl vortex separator showing the flows of gas/liquid solid within the housing and their interactions with vortex elements.

The swirl element 14 is located adjacent the upstream end 12a the housing. The swirl element generally functions to induce a rotational flow into the flowing gas/liquid/solid mixture 18 as it enters the housing. The swirl element will generally include a fixed series of stator vanes 14a angled to deflect the mixture in a radial direction and towards the inner housing 12c. An actively driven fan (not shown) may be positioned upstream or downstream of the stator vanes to provide flow to the mixture. The stator vanes will typically be angled between 40 and 70 degrees with respect to the housing axis 24 as shown in FIG. 3. Increasing the angle of deflection above 70° will generally prevent the formation of effective downstream vortices and create significant pressure drop with the housing. An angle of deflection less than 40 degrees will typically not impart sufficient centrifugal forces on the solid/liquid particles/droplets to direct the particles effectively towards the housing. The preferred angle of deflection will be about 50-65 degrees, and more preferably about 60 degrees. The swirl elements may include curved vanes.

Vortex Elements

The vortex elements are positioned within the housing in pairs downstream of the swirl element. As shown in FIG. 3, each pair of vortex tabs has a vortex tab axis 40 aligned with the direction of flow which as a result of the swirl element is angled with respect to housing axis (HA). As with the swirl elements, the angle between housing axis HA and the vortex tabs axis 40 is preferably 40-70 degrees.

The vortex elements generally comprise a pair of converging vanes or diverging vanes. That is the narrow end of the vortex tab "cone" can face upstream or downstream. Cones shown in FIG. 3 diverge in the downstream direction.

Each pair of vortex elements is generally evenly distributed about the housing and are positioned so as to generally not overlap with one another in the direction of flow. That is, it is generally desirable that one pair of vanes does not directly block a downstream pair of vanes so as to enable smooth swirling motion through the housing.

Vanes may have a variety of shapes and be positioned in a number of ways within the housing while enabling the creation of counter-rotating vortices.

Figure 4:
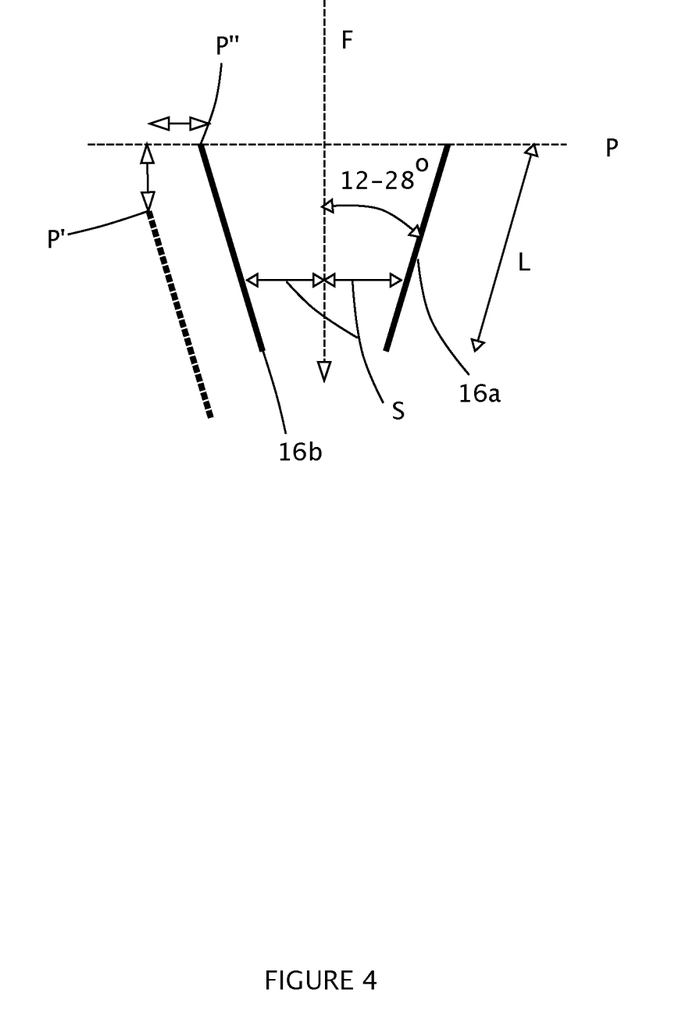
FIG. 4 is a schematic diagram showing the relative positioning of vortex elements relative to one another and the general direction of flow.

As shown in FIG. 4, relative to an axis and direction of flow F, edges of the vanes may both be positioned on a line P perpendicular to direction of flow and evenly positioned S relative to the axis F (position 1). In various embodiments, the leading or trailing edges may be offset P' with respect to P, namely both "horizontally" and "vertically" with respect to P" (position 2).

The vane axis F will generally be parallel to the trailing edges swirl element vanes, that is angle approximately 40-70 degrees with respect to the HA.

The spacing 2S between vortex vanes and their height H are important to ensure that the vortices form and that they reach the sidewall 12c. Generally, H should be between 5-20% of diameter of housing.

The length L to height H ratio of each vane should be between 2:1 and 6:1.

Vanes may be adjustable, namely pivotal and/or extendable 60 with respect to the housing as shown in FIG. 1 to enable tuning of the system for variations in input content and flow rate. Vanes may also be connected to one another via an interconnecting tab (not shown) to simplify connection to the housing.

Figure 5:
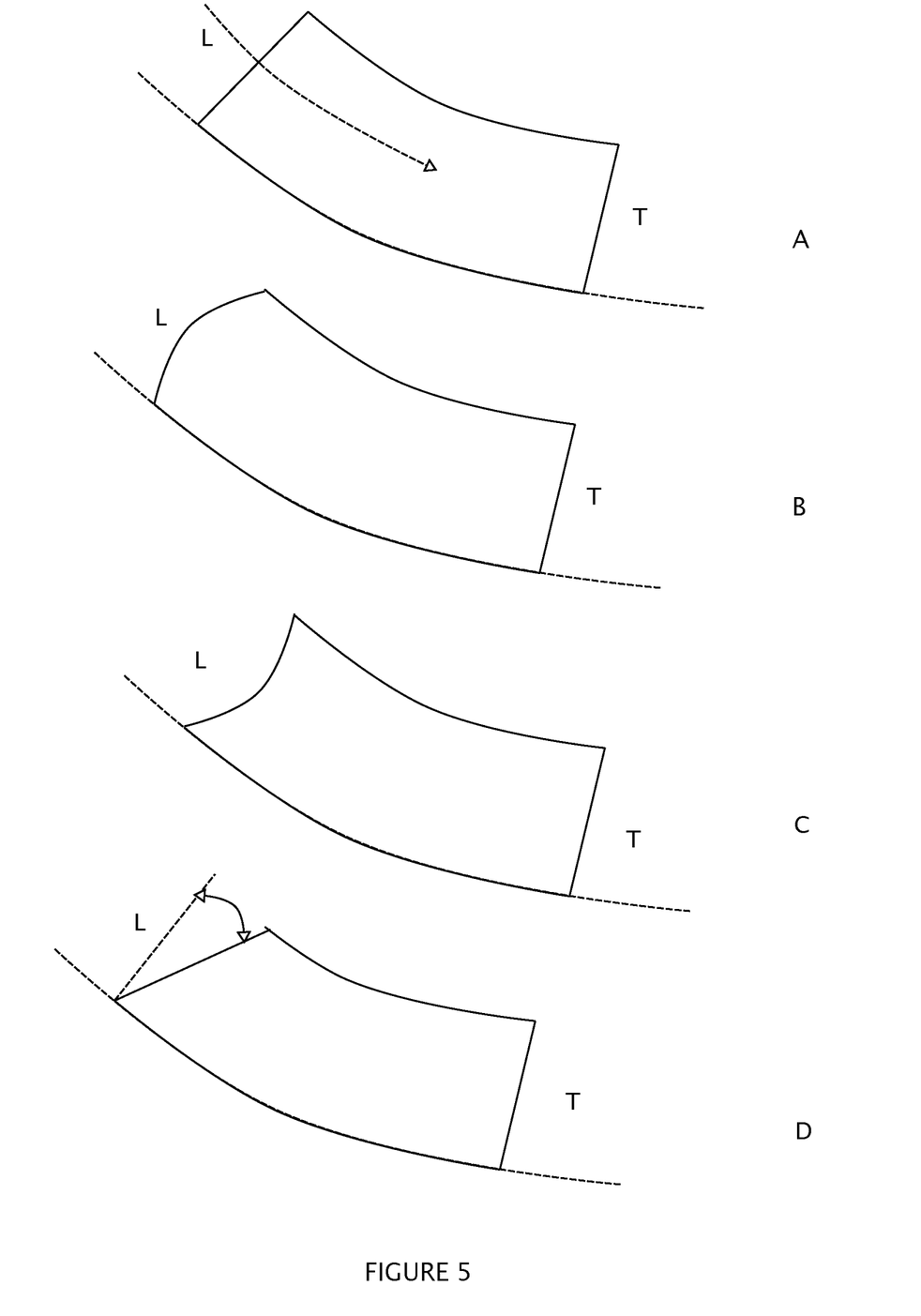
FIG. 5 is a schematic diagram of the variations in the shapes of the leading and trailing edges of the vortex elements in accordance with various embodiments of the invention.

As shown in FIG. 5, vanes may have leading L and/or trailing T edges that are various combinations of straight (5A), convex (5B), concave (5C) and backswept (5D) to promote vortex formation. For the purposes of simplicity, FIG. 5 shows various shapes of the leading edges but it is understood that these shapes can be applied to trailing edges as well.

The spacing S between vortex tabs 16a, 16b depends on the height H of the vortex tabs. Generally, if the vortex tabs 16 are too high and the spacing between too close, the vortices will not properly form and hence small particles will not get to the sidewall 12a. If the spacing is too wide, then the small particles are not affected by the vortices and also not get to the sidewall.

Pressure Reduction and Smooth Flow

Preferably, the system will include systems to prevent pressure build-up and otherwise maintain even flow through the system. In one embodiment, the system includes flow surfaces 30 downstream of the swirl element to prevent the creation of disruptive turbulent flow that may affect the flow over the vortex tabs. Similarly, as shown in FIG. 1A, 1B gas may be recycled through recycle system 55 that directs gas entering the drain 20 back to the upstream end. As shown, recycle gas may flow through the annular space 12*e*. The reintroduction of gas can be upstream or downstream 55*a* of swirl element or both.

Liquid Injection

As noted, the system preferably includes a liquid injection system 50*a*, 50*b*, 50*c* that is used to enhance the capture of solid/liquids. In various embodiments, liquid is injected under pressure in a manner and location so as to create a film 26 over the housing wall 12*a* as shown schematically in FIG. 3. Generally, liquid will flow in a direction generally parallel to the flow of the gas mixture.

The liquid may be water or other liquids (eg. methanol) that may help entrain a particular solid. That is, the liquid may be selected on the basis of its ability to react with the solid and/or the interfacial interaction between a particular solid and liquid combination. In another embodiment, the introduced liquid may effectively neutralize the acidity or basicity of an input stream. For example, a caustic solution may be used with a stream containing acidic particles and gas as a means of neutralizing the acidic stream for downstream handling and/or to minimize damaging effects of the stream on other equipment.

General Theory of Operation

Without being bound to any particular theory, it is generally understood that the swirl element induces a centrifugal force on the denser particles (ie. solids and liquids) which moves these particles radially towards the housing. As the swirling mixture engages with the vortex tabs, the solid/liquid particles flow over the vortex tabs forming a spiraling stream of solid/liquid particles flowing off each vortex tab (see FIG. 2). The counter rotating vortices of each vortex tab pair causes spiraling interaction between these two streams which in addition to the centrifugal force from the swirl element and an uneven boundary layer on the housing, brings the streams against the housing.

In the preferred embodiment, where the housing has a liquid film flowing over the housing, the vortices a) disrupt what may otherwise be laminar flow of liquid over the housing and b) bring the stream of particles against the liquid film at a sharper angle where they may impact against and become trapped within the liquid film. In other words, the vortex tabs interrupt what may be the laminar flow of liquid over the housing which creates a more turbulent surface which both increases the surface area of the liquid film which enhances the ability of the liquid film to entrain solid particles.

In comparison, centrifugal systems that do not have vortex tabs, while bringing solid/liquid particles close to the housing by centrifugal forces, these systems can create laminar boundary layers that are difficult for very fine and low mass particles to enter.

In operation, the flow of the input mixture is maintained at a level to induce counter rotating vortices of the vortex tabs.

Applications

Example applications include applications where it is desirable to remove small particles from a gas stream. Examples of gas sources include flue gases containing dust/smoke/ash particles from a furnace, incinerator, boiler, etc. and gas transmission lines.

The system may be used as a filter upstream of HVAC systems on the air intake to an air heater such as a furnace or an air cooler such as a chiller or HVAC system, or it could be used without heating/cooling as an air filter/purifier in an air intake system. Example air intake systems could be air intakes for vacuum systems, engine intakes or any standalone air filtration system.

Example 1

A system comprising a horizontal clear tube having a 6 inch internal diameter and 4.5 foot length was tested with a 700 ACFM (actual cubic feet per minute) air flow. The system included swirl element vanes oriented at 50 degrees to the flow path together with 4 pairs of vortex tabs spaced evenly about the inner housing. Each pair of vortex vanes had straight leading and trailing edges and had a height of 0.4 inches and a length of 2.3 inches. For testing purposes, fine threads were attached to the inner trailing edge corner to visually observe the creation and direction of flow of vortices off the trailing edges. The vortex vanes of a pair were separated by 0.5 inches and angled at approximately 50 degrees to the longitudinal axis of the housing.

For a given vortex tab orientation, air flow was established and the movement of tell tales observed. As airflow was steadily increased from 0 to 700 ACFM, the telltales would initially show no discernable pattern of movement. As air flow was increased, counter rotating vortices would be observed.

Upon establishing air flow, water was introduced upstream of the swirl element via high pressure atomizing nozzles so as to create a fine distributed mist upstream of the swirl element. The water was observed as 4 discernable spiraling streams downstream of each of the 4 pairs of vortex tabs which demonstrated that the water mist particles collided with each other and moved to the housing wall in an observable stream. Separate spiraling water streams were not observed upstream of the vortex tabs.

Similarly, when the same system was tested without vortex tabs, no discernable water patterns were seen along the length of the housing.

In one test, a recycle tube was used to allow the recycling of air to a position upstream of the swirl element. In this test, no internal and central tube was included. This test showed that recycled air reduced the pressure drop across the swirl element and improved the formation of the spiraling streams of water.

Example 2

A vertical clear tube housing with a 4 inch outside diameter and an inside diameter of 3.75 inches was set with a swirl element that induced a swirl at 58 degrees to the longitudinal axis. An inside tube having an OD of 1.32 inches ran the length of the tube in the centre.

Water was injected above the swirl element through 6 holes having 0.08 inch diameter and evenly spaced about the tube housing. The flow rate of the water was maintained at approximately 6 gallons per hour.

Air flow through the housing was maintained at 100 ACFM (actual cubic feet per minute). Talcum powder having a mean particle size diameter less of 0.5 microns was introduced to the air flow via a 100 psi air injection system upstream of the swirl element at right angles to the direction of air flow through the housing. With the rate of injection and angles of intersection, the powder was observed as being fully dispersed within the air flow almost instantaneously.

A bank of Filterite™ sub micron filters was set downstream at the gas exit to catch any particulate carry over. The filters were weighed before and after each run.

A total of 3 lbs of talcum powder was introduced to the system over a 10 minute run. The filters were weighed using a gram scale to determine a mass carry over of the particulate. No measurable difference in the weight of the filters was seen after running the entire 3 pounds of powder. The water recovered from the housing was milky white.

The pressure drop across the swirl element was 1.8 inches of water column.

Importantly, the pressure drop was substantially less than a typical cyclone separator which would typically operate at 28 inches of water column and would only be able to separate particles greater than 10 microns.

While the present invention has been described in the context of specific embodiments thereof, other alternatives, modifications, and variations will become apparent to those skilled in the art having read the foregoing description. Accordingly, it is intended to embrace alternatives, modifications, and variations as fall within the broad scope of the appended claims.

The invention claimed is:

1. An in-line swirl vortex separator for separation of solid particulates and/or fine liquid droplets from a vapor stream comprising:
    a housing, the housing including a swirl element and at least one vortex element, the at least one vortex element proximate and downstream from the swirl element, each vortex element comprising at least one pair of converging or diverging vortex tabs positioned against an inner surface of the housing, wherein each pair of vortex tabs has a vortex tab axis aligned with a direction of vapor flow, and wherein each pair of converging or diverging vortex tabs creates a pair of vortices that are substantially equal and opposite in direction adjacent the inner surface of the housing; and
    a liquid injector and liquid injection system connected to the housing to deliver a film of liquid over the inner surface of the housing.

2. The in-line swirl vortex separator as in claim 1 where each pair of vortex tabs are angled relative to the vortex tab axis between each pair of vortex tabs.

3. The in-line swirl vortex separator as in claim 2 where the angle between each vortex tab and the vortex tab axis is 12-28°.

4. The in-line swirl vortex separator as in claim 1 where each vortex tab has a leading edge and a trailing edge and wherein each leading edge and trailing edge is any one of straight, swept forward, swept backwards, convex or concave relative to a direction of flow.

5. The in-line swirl vortex separator as in claim 1 wherein the housing has an inside diameter (ID) and each vortex tab has a height and wherein a ratio of ID to height is between 5:1 and 50:1.

6. The in-line swirl vortex separator as in claim 1 wherein each vortex tab has a length and a height and a ratio of length to height is between 2:1 and 6:1.

7. The in-line swirl vortex separator as in claim 1 wherein the housing further comprises an outer housing radial to the housing, the outer housing configured to create an annular space between the housing and outer housing and wherein the housing includes a circumferential drain adjacent a downstream end of the housing enabling solid/liquid flowing along the housing to drain to the annular space.

8. The in-line swirl vortex separator of claim 7, where the annular space enables gas within the annular space to be recycled to an upstream location within the housing.

9. The in-line swirl vortex separator as in claim 7 where the annular space includes a sump for draining fluids/solids from within the annular space.

10. The in-line swirl vortex separator as in claim 1 wherein the swirl element includes a plurality of stator vanes angled between 40-70° relative to a longitudinal axis of the housing, the stator vanes for inducing swirling flow of gas/liquid/solids flowing through the housing.

11. The in-line swirl vortex separator as in claim 10 where the vortex tab axis between each pair of vortex tabs is substantially aligned with the angle of the stator vanes.

12. The in-line swirl vortex separator as in claim 10 where each pair of vortex tabs are adjustable in at least one of height relative to an inner surface of the housing and the angle of the vortex tab axis relative to the longitudinal axis of the housing.

13. The in-line swirl vortex separator as in claim 1 where the housing further comprises a liquid injection system, the liquid injection system to deliver a liquid:
    a. proximate and upstream of the swirl element;
    b. between the swirl element and the at least one vortex element; or
    c. proximate the at least one vortex element.

14. The in-line swirl vortex separator as in claim 13 further comprising a liquid/solid reservoir for receiving liquid/solid from the housing and a pump for returning recovered/liquid solid to the housing at an upstream position of the housing.

15. A method of separating solid particulates and/or fine liquid droplets from a vapor stream within a housing comprising the steps of:
   a. swirling the vapor stream to form a swirling vapor stream;
   b. introducing a liquid film by a liquid injector over an inner surface of the housing to deliver a film of liquid over the inner surface of the housing;
   c. generating pairs of vortices by at least one pair of converging or diverging vortex tabs on an inner wall of the housing, where in the swirling vapor stream, the vortices are substantially equal and opposite in direction adjacent the inner wall of the housing, and where each of the pairs of vortex tabs has a vortex tab axis aligned with a direction of vapor flow; and
   d. removing the contaminant from the vapor stream.

16. The method of claim 15, wherein the combined effects of swirling and the vortices generate centrifugal force in the same direction.

17. The method of claim 16, further comprising the step of injecting liquid:
   proximate and upstream of the swirling; between the swirling and the vortices; or
   proximate the vortices.

18. The method of claim 17 further comprising the step of recovering liquid from a downstream location of the housing and recycling at least a portion of the recovered liquid to an upstream location of the housing.

19. The method of claim 15 wherein the angle, position, height and length of the vortex tabs are matched to a gas flow rate within the housing to effect separation of solid particles smaller than 1 micron from the flowing gas.

* * * * *